US009843648B2

(12) United States Patent
Kosakai et al.

(10) Patent No.: US 9,843,648 B2
(45) Date of Patent: *Dec. 12, 2017

(54) CACHING GEOGRAPHIC DATA ACCORDING TO SERVER-SPECIFIED POLICY

(71) Applicant: GOOGLE INC., Mountain View, CA (US)

(72) Inventors: Takahiro Kosakai, Tokyo (JP); Yuta Sawa, Tokyo (JP); Satoshi Niwa, Tokyo (JP); Toliver Jue, Tokyo (JP); David R. Gordon, Shibuya-ku (JP)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,827

(22) Filed: Sep. 19, 2016

(65) Prior Publication Data

US 2017/0013080 A1  Jan. 12, 2017

Related U.S. Application Data

(63) Continuation of application No. 14/089,436, filed on Nov. 25, 2013, now Pat. No. 9,451,041.

(Continued)

(51) Int. Cl.
*G06F 15/16* (2006.01)
*H04L 29/08* (2006.01)
(Continued)

(52) U.S. Cl.
CPC .... *H04L 67/2842* (2013.01); *G06F 17/30132* (2013.01); *G06F 17/30899* (2013.01);
(Continued)

(58) Field of Classification Search
CPC .................................................. H04L 67/2842
(Continued)

(56) References Cited

U.S. PATENT DOCUMENTS 8,296,394 B1\* 10/2012 Asher ............... G06F 17/30551
709/217
8,352,684 B2  1/2013 Archambault et al.
(Continued)

OTHER PUBLICATIONS

ACM Digital Library, "Pine-Guided Cache Replacement Policy for Location-Dependent Data in Mobile Environment," Proceedings of the 1st International Conference on Pervasive Technologies Related to Assistive Environments, Abstract Only (2008). Retrieved from the Internet on Nov. 26, 2013: URL:http://dl.acm.org/citation.cfm?id=1389606.

(Continued)

*Primary Examiner* — Glenford Madamba
(74) *Attorney, Agent, or Firm* — Marshall, Gerstein & Borun LLP

(57) ABSTRACT

Caching or discarding geographic data received at a client computing device may be based on a caching policy for the geographic data. A caching policy may define conditions to process the geographic data at the client device based on several factors. For example, a current position of the client device or a position of a portion of a map displayed within a viewport of the device may cause the device to cache or discard the received geographic data. The device may determine a relationship between the viewport and the received geographic data, compare the determined relationship to the caching policy and cache or discard at least a portion of the received geographic data based on the comparison.

20 Claims, 4 Drawing Sheets

Related U.S. Application Data

(60) Provisional application No. 61/844,310, filed on Jul. 9, 2013.

(51) Int. Cl.
  *G06F 17/30* (2006.01)
  *H04L 29/06* (2006.01)
  *H04W 4/02* (2009.01)

(52) U.S. Cl.
  CPC ........ *G06F 17/30902* (2013.01); *H04L 67/18* (2013.01); *H04L 67/42* (2013.01); *H04W 4/023* (2013.01)

(58) Field of Classification Search
  USPC ........................................................ 709/213
  See application file for complete search history.

(56) References Cited

U.S. PATENT DOCUMENTS

| | | | |
|---|---|---|---|
| 8,447,875 | B2 | 5/2013 | Liu et al. |
| 2002/0015042 | A1* | 2/2002 | Robotham ............... G06F 3/14 345/581 |
| 2006/0080031 | A1 | 4/2006 | Cooper et al. |
| 2008/0091732 | A1 | 4/2008 | Schmidt et al. |
| 2009/0228661 | A1 | 9/2009 | Borlick |
| 2010/0104174 | A1 | 4/2010 | Rohlf et al. |
| 2011/0225311 | A1 | 9/2011 | Liu et al. |
| 2013/0137688 | A1 | 5/2013 | Grauert et al. |

OTHER PUBLICATIONS

Chavan et al., "A Survey of Mobile Database Cache Replacement Policies," (2010). Retrieved from the Internet on Nov. 26, 2013: URL:http://saurabhpatil.webs.com/CRPSURVEY.pdf.

Chavan et al., "Mobile Database Cache Replacement Policies: LRU and PPRRP," Advances in Computer Science and Information Technology Communications in Computer and Information Science, 133:523-531 (2011). Abstract Only. Retrieved from the Internet on Nov. 26, 2013: URL:http://link.springer.com/chapter/10.1007%2F978-3-642-17857-3_51.

Duong et al., "Improving Cache Management Policies Using Dynamic Reuse Distances," Proceedings of the 2012 45th Annual IEEE/ACM International Symposium on Microarchitecture, pp. 389-400 (2012).

Extended European Search Report for Application No. 14747449.8, dated Nov. 30, 2016.

Ghosh et al., "Hybrid Cache Replacement Policy for Proxy Server," *International Journal of Advanced Research in Computer and Communication Engineering*, 2(3):1527-1532 (2013).

IEEE Xplore®, "Network Distance Based Cache Replacement Policy for Location-Dependent Data in Mobile Environment," Abstract Only (2013). Retrieved from the Internet on Nov. 26, 2013: URL:http://ieeexplore.ieee.org/xpl/login.jsp?reload=true&tp=&arnumber=4839098&url=http%3A%2F%2Fieeexplore.ieee.org%2Fiel5%2F4839075%2F4839076%2F04839098.pdf%3Farnumber%3D4839098.

International Search Report and Written Opinion for Application No. PCT/US2014/045943, dated Feb. 27, 2015.

Joy et al., "Cache Replacement Policies for Cooperative Caching in Mobile Ad hoc Networks," *IJCSI International Journal of Computer Science Issues* (2012).

Kwong et al., "Location-Aware Cache Replacement for Mobile Environments," Global Telecommunications Conference, 6(29):3441-3447 (2004).

Microsoft Developer Network, "Caching Architecture Guide for .NET Framework Applications," (2013). Retrieved from the Internet on Nov. 26, 2013: URL:http://msdn.microsoft.com/en-us/library/ee817650.aspx.

Rory Primrose Blog, "Cache Expiration Policies," (2013). Retrieved from the Internet on Nov. 26, 2013: URL:http://www.neovolve.com/page/Cache-Expiration-Policies.aspx.

* cited by examiner

CACHING GEOGRAPHIC DATA ACCORDING TO SERVER-SPECIFIED POLICY

CROSS REFERENCE TO RELATED APPLICATIONS

This application is a continuation of U.S. patent application Ser. No. 14/089,436, filed Nov. 25, 2013, which claims the benefit of U.S. Provisional Patent Application No. 61/844,310 filed Jul. 9, 2013, the disclosures of which are hereby incorporated herein by reference in their entirety.

FIELD OF TECHNOLOGY

The present disclosure relates generally to displaying interactive digital maps and, more particularly, to caching map data based on a server-specified caching policy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Often, software applications that display interactive digital maps on mobile devices cache, or temporarily store in memory, certain map content. Such cached map data is easily and efficiently retrieved by the mobile device and can be displayed in near real-time on a display device. For example, a mobile device may cache information about points of interest (POIs), such as addresses, phone numbers, pictures, etc. However, servers, from which map data is distributed, update map data on a normal basis, and, as a result, the map data cached in the memory of a mobile device can be out-of-date or inconsistent with map data distributed by a server.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A method for caching geographic content in a client device includes receiving, from a network server, content related to a geographic location. For example, the content can include information for a business located in a certain geographic area (such as the area visible in a viewport—a virtual frame that delimits a viewing region on a digital map—of a mapping application) or map tiles for rendering a digital map. The method also includes receiving, from the network server, an indication of a caching policy for the provided content, such that the caching policy is based on a geographic factor. For example, the geographic factor can be distance from the current location of the client device to the geographic location corresponding to the content (e.g., "cache the informational card for this restaurant until the client device is 20 miles away"), the current location of the viewport (e.g., "cache the informational card for this restaurant until the viewport is positioned over an area centered around a point that is 20 miles away"), etc. In some cases, the caching policy can specify additional factors, such as time, for example. The method further includes caching the content in accordance with the server-specified caching policy.

In one embodiment, a computer-implemented method may process geographic content in a client device. The method may receive geographic data and a caching policy for the geographic data. The geographic data may be related to a geographic location and the caching policy may define one or more conditions to process the geographic data at the client device. The method may also display the geographic data within a viewport of the client device and determine a relationship between the viewport and the received geographic data. The method may then compare the determined relationship to the caching policy and process at least a portion of the received geographic data based on the comparison.

In another embodiment, a mapping system may be configured to process geographic content in a client device according to a caching policy. The system may include a client computing device including a processor and a memory, the memory including instructions executed. For example, the instructions may receive geographic data and a caching policy for the geographic data. The geographic data may be related to a geographic location and the caching policy may define one or more conditions to process the geographic data at the client device. The instructions may also display the geographic data within a viewport of the client device and determine a relationship between the viewport and the received geographic data. The instructions may then compare the determined relationship to the caching policy and process at least a portion of the received geographic data based on the comparison.

In still another embodiment, a tangible computer-readable medium may include non-transitory computer readable instructions stored thereon for processing geographic content in a client device. The instructions may receive geographic data and a caching policy for the geographic data. The geographic data may be related to a geographic location and the caching policy may define one or more conditions to process the geographic data at the client device. The instructions may also display the geographic data within a viewport of the client device and determine a relationship between the viewport and the received geographic data. The instructions may then compare the determined relationship to the caching policy and process at least a portion of the received geographic data based on the comparison.

A further embodiment may include a computer-implemented method or system for caching data corresponding to geographic content in a client computing device. For example, the method or system may display first geographic data within a viewport of the client computing device and receive an instruction to move the viewport to display second geographic data within the viewport. The first and second geographic data may not simultaneously display within the viewport. The method or system may then receive an instruction to cache or discard the geographic data based on a distance relationship between the first geographic data and the second geographic data, and execute the instruction at the client computing device.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

A map data server specifies the policy for caching map data 80, 90 (FIG. 3) (e.g., informational cards or imagery) on a mobile device 105, such as a smartphone, tablet computer, etc. The map data server uses a particular protocol to specify the caching policy and may update, modify, or otherwise manipulate the caching policy at any time. In some cases, the caching policy is at least partially based on physical distances between a geographic point corresponding to the map data and a geographic reference point, where the geographic reference point may be the geographic location of the mobile device 105 or a location of a mapping viewport on a digital map.

Figure 1:
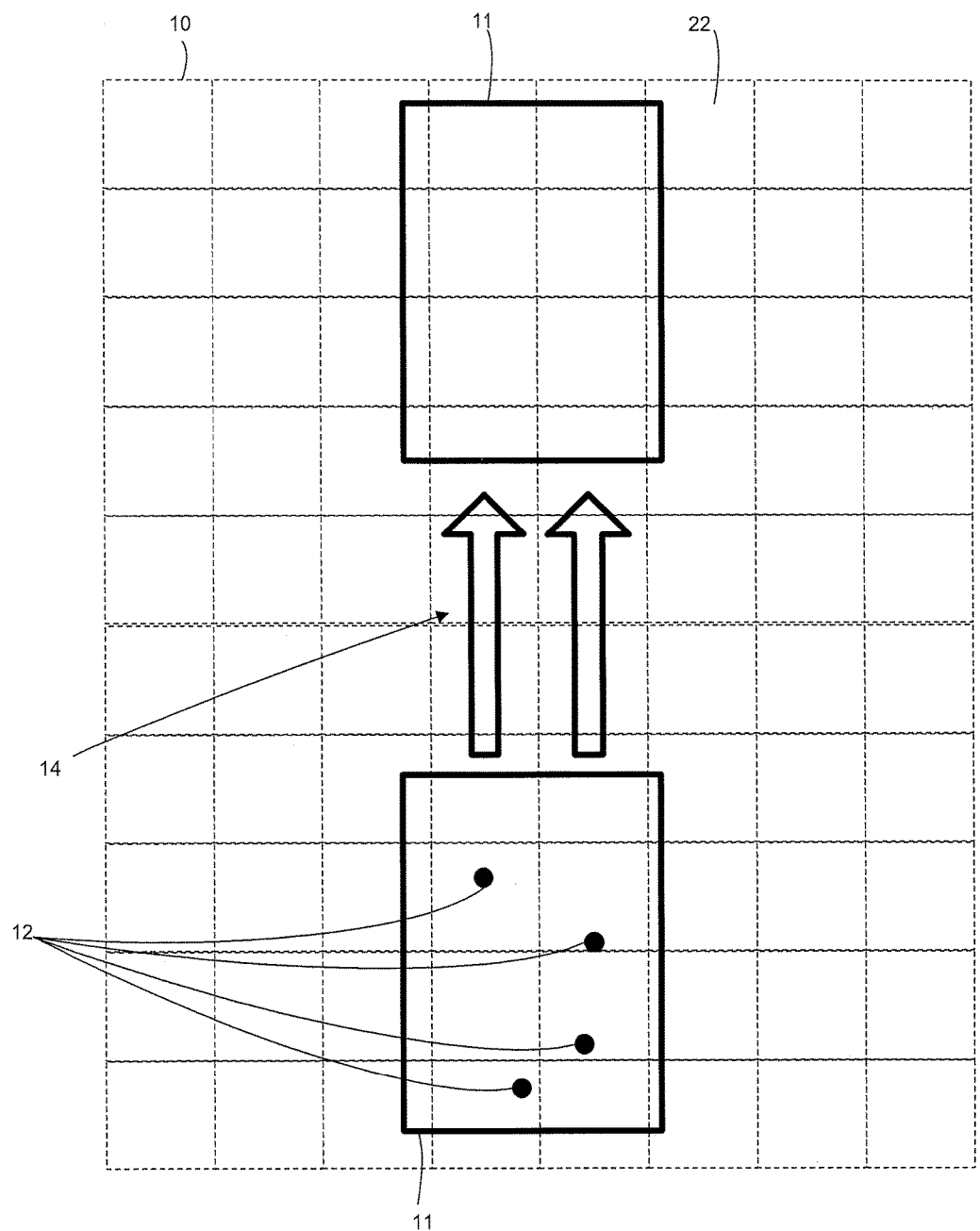
FIG. 1 schematically illustrates an example trajectory of a viewport moving away from geographic point associated with cached map data.
Figure 2:
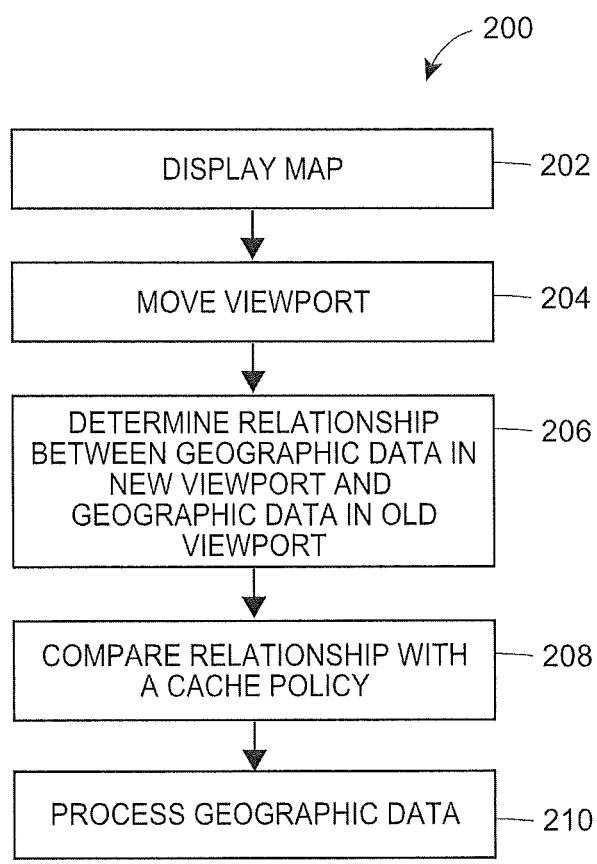
FIG. 2 is an exemplary flowchart of a computer-implemented method for caching data corresponding to geographic content in a client computing device according to a caching policy.

Referring to FIGS. 1 and 2, a software application and computer-implemented method 200 may be stored on a computer-readable storage medium and include non-transitory instructions that, when executed by a processor, display an interactive digital map 10 within a viewport 11 (function 202) of a client computing device and allow movement of a viewport 11 from its current position to a new, relatively far removed, position (function 204). The map 10 may be derived from geographic data received from a backend map data server 47 (FIG. 3) at function 202. In addition to the geographic data, the client computing device may receive a caching policy 106A (FIG. 4) at function 202, as described herein. The direction of movement of the viewport 11 is illustrated in FIG. 1 with arrows. As one example, the software application and method 200 includes instructions to move the viewport 11 at function 204 when a user "flings" the viewport with a finger gesture 202 to display different geographic data. Before the movement begins, or as the movement starts and/or ends, the software application may cause the processor to execute an instruction to determine a relationship between the new position of the viewport (e.g., distance, time, etc.) and the geographic data received and displayed at function 206, compare that relationship to the received caching policy at function 208, and processing map data corresponding to a plurality of geographic locations 12 (e.g., information about POIs, geo-reference imagery, etc.), for example, at function 210. Processing the geographic data at function 210 may include caching the geographic data at the client computing device, discarding the data, or other action according to the caching policy 106A received at function 202.

In an implementation, the software application causes the processor to execute an instruction to cache map data according to a server-specified caching policy 106A (FIG. 3) received from a map data server 47. The server-specified policy 106A may be at least partially based on distances between the geographic locations 12 and one or more geographic reference points. For example, the map data server 47 may specify a policy 106A in which the software application causes a processor to execute an instruction to cache map data for a geographic point within a current viewport 11 and subsequently causes a processor to execute an instruction to discard the cached map data 80, 90 when the centroid of the viewport 11 moves a distance of one mile or more (or another distance specified by the policy 106A) from the geographic point. The latency in retrieving and rendering nearby map data is thereby reduced, and the user accordingly sees quicker, smoother transitions between currently displayed map data and recently viewed nearby map data.

The received geographic data and the cached map data 80, 90 can include vector graphics data rendered at the client device 105, raster (bitmap) data, or both. For example, cached map data 80, 90 may include informational cards corresponding to POIs, addresses, etc., geo-reference imagery, labels, navigation routes, supplemental data layers (e.g., traffic, weather, etc.), a combination of these, or any other suitable map data. Further, map tiles 22 themselves, from which a digital map is constructed, are, in some cases, cached according to a server-specified policy.

Figure 3:
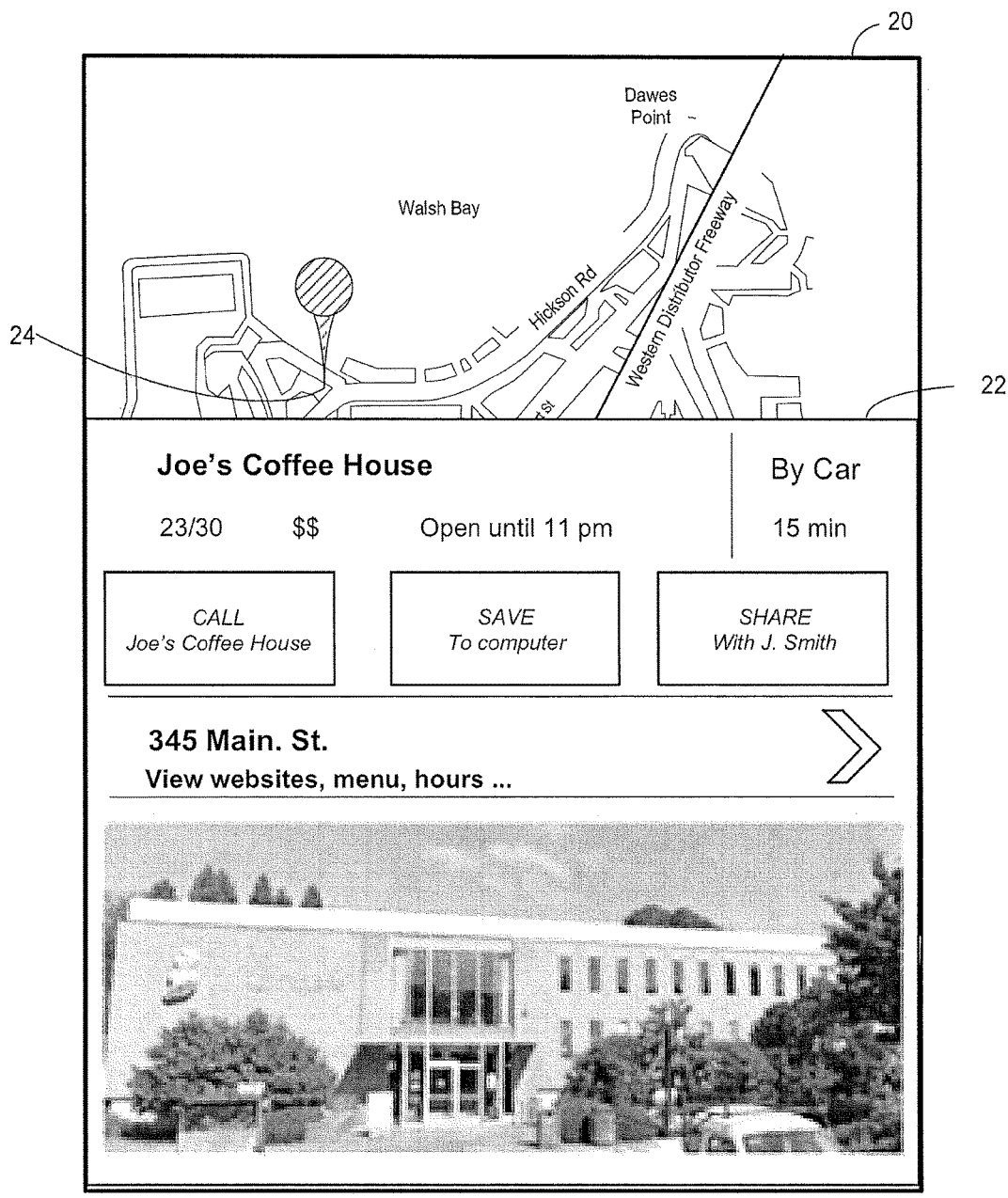
FIG. 3 is an example screenshot of a mapping application with an informational card that is cached according to a server-specified policy.

FIG. 3 is an example screenshot 20 of a user interface for a mapping application which causes a processor to execute an instruction to display cached map data 80, 90. In this example screenshot 20, the cached map data 80, 90 includes an informational card 22 with information related to a POI ("Joe's Coffee House") at geographic location 24. The informational card 22 may be cached in the local memory of a mobile device 105 displaying screenshot 20 and discarded, according to a server-specified policy 106A, when the mapping viewport is moved a certain distance away from the geographic location 24, in an implementation.

Figure 4:
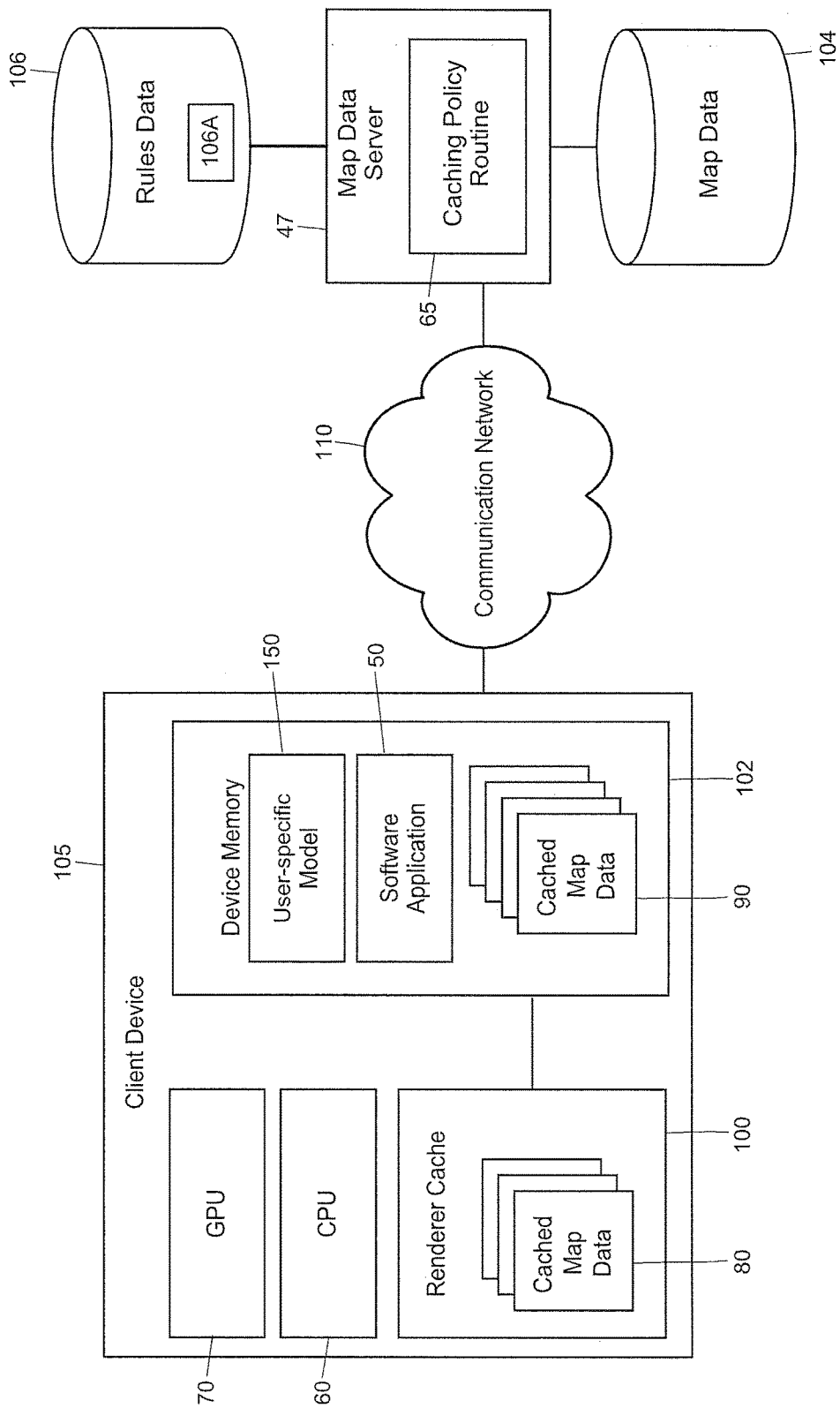
FIG. 4 illustrates an example computing environment in which a software application can cache map data according to a server-specified policy.

FIG. 4 illustrates an example map data server 47 and an example software application 50 that can implement the caching techniques of this disclosure. The software application 50 can be, for example, a special-purpose application or a web browser executed by a CPU (60). In general, the software application 50 includes non-transitory, computer-executable instructions to cache map data 80, 90 in a memory (100) or memory 102 according to a policy 106A generated by the caching policy routine 65 on the map data server 47. As one example, the memory 100 is a cache that operates in the rendering pipeline, such as GL cache, of a graphic processing unit (70) and the memory 102 is a slower memory on the device 105, such as RAM or even persistent memory such as flash or hard disk.

In some cases, the map data server 47 specifies different caching policies 106A for different types of map data 80, 90. For example, the map data server 47 may specify a certain caching policy 106A for photographic image data, a certain caching policy 106A for text data, etc. Also, the map data server 47 may specify different caching policies 106A based on the notability of POIs. For example, the application 50 may include a non-transitory instruction for execution by a processor to discard data associated with landmarks and monuments from a cache when a viewport is further away from the respected points, as compared with data associated with insignificant (e.g., according to a knowledge base) geographic points. As yet another example, the caching policy 106A can be based on how frequently similar types of business or other map features occur on the map. Thus, the map data server 47 may include a non-transitory instruction that, when executed by a processor, can instruct the client device 105 to cache the information for a museum for a larger range of movement of the viewport, and cache the information about a fast-food place for a smaller range of movement of the viewport (because generally there are more fast-food places than museums).

Also, the map data server 47 can generate a caching policy 106A, by executing caching policy routine 65, based on both time and distance parameters. For example, the map data server 47 may include a non-transitory instruction that, when executed by a processor, specifies a caching policy that instructs a mobile device 105 to discard cached map data after ten minutes regardless of the distance between a map viewport and a geographic location associated with the map data. At the same time, the caching policy 106 may include a rule to instruct the mobile device 105 to discard cached map data when geographic points associated with the cached map data are fifteen miles from the centroid of a current viewport, in the example. In general, server-specified caching policies 106A may be complicated (e.g., with multiple different rules for multiple different types of data) or simple (e.g., with one rule for all types of data) for specific needs and/or applications.

The map data server 47 may generate server-specified caching policies 106A automatically, via the caching policy routine 65, or based on policy rules stored in a rules database 106, in an implementation. For example, the map data server 47 may generate a server-specified caching policy 106A based on pre-defined rules associated with certain types of data, certain types of mobile devices, etc. In another example, the caching policy routine 65 may generate new server-specified caching policies 106A for each map item sent to a mobile device 105.

The server-specified policies 106A of the present disclosure may be at least partially based on any suitable physical or virtual distance with respect to geographic points corresponding to cached map data 80, 90. For example, a server-specified policy 106A may use a distance between a geographic point and a centroid, or other reference point, of a viewport as a basis for a policy. In another example, a server-specified policy 106A may use a distance between a geographic point and the physical location of a mobile device (e.g., latitude and longitude) as a basis for a policy, assuming the user of the device consents to such use of the location. In general, a server-specified caching policy 106A may be based on geographic locations associated with the map data and geographic locations associated with at least one of a viewport, mobile device, other POI, frequently accessed viewport, frequently searched geographic query, etc.

In some implementations, the map data server 27 may specify both the storing of map data 80, 90 into a cache and the discarding of map data from the cache according to distances associated with the map data. For example, a map data server 47 may specify that informational cards associated with notable POIs within a twenty kilometer radius of the current viewport centroid are to be stored in a cache, such as the memory 102 or the cache 100. While at the same time, the map data server 47 may specify that stored informational cards corresponding to geographic locations over twenty kilometers away from the current viewport centroid are to be discarded.

The map data server 47 may send server-specified policies 106A to mobile devices 105 via any suitable protocol, such as a hypertext transfer protocol (HTTP) or a similar protocol specifically designed for specifying caching policies, in an implementation. For example, the map data server 47 may use a POST HTTP request to send server-specified policies 106A to mobile devices 105. In some cases, the map data server 47 may send the server-specified policies 106A along with the map data 80, 90 to be cached according to the policies, and, in other cases, the map data server 47 may send server-specified policies 106A separate from other map data 80, 90. For example, server-specified policies may be updated, modified, or deleted periodically, or at any suitable time, via a dedicated request from the map data server 47.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a tangible machine memory (e.g., a computer memory). These algorithms or symbolic representations are examples of techniques used by those of ordinary skill in the data processing arts to convey the substance of their work to others skilled in the art. As used herein, an "algorithm" or a "routine" or a "block" is a self-consistent sequence of operations or similar processing leading to a desired result. In this context, algorithms, routines, blocks, and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment or embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for processing geographic content through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for processing geographic content in client computing devices, the method comprising:
    receiving, at a client computing device from a server, geographic data and a caching policy for the geographic data, at a first time, the geographic data related to a first geographic location and the caching policy defining a condition to cache or discard the geographic data at the client computing device, wherein the condition includes a threshold related to one of distance or time;
    displaying the geographic data within a viewport of the client computing device when the viewport depicts a digital map corresponding to the first geographic location;
    moving the viewport to an updated position corresponding to a second geographic location;
    determining, at a second time and in accordance with the condition, at least one of: (i) a distance between the first geographic location and the second geographic location, or (ii) a time difference between the first time and the second time, to generate a difference metric;
    comparing the determined difference metric to the threshold in accordance with the condition; and
    caching or discarding the received geographic data based at least in part on the comparison, including caching the received geographic data when the difference metric is below the threshold and discarding the received geographic data when the difference metric is above the threshold.

2. The method of claim 1, wherein:
    the condition is a first condition related to distance, the caching policy further defining a second condition related to time, wherein the caching or discarding the received geographic data depends on both the first condition and the second condition.

3. The method of claim 1, further comprising receiving, at the client computing device from the server, an update to the received caching policy, subsequently to receiving the caching policy.

4. The method of claim 1, further comprising receiving, at the client computing device from the server, an instruction to delete the received caching policy.

5. The method of claim 1, wherein receiving the caching policy for the geographic data includes receiving different caching policies for different types of data.

6. The method of claim 5, wherein receiving the different caching policies includes receiving different policies for photographic image data and text data.

7. The method of claim 5, wherein receiving the caching policy for the geographic data includes:
    receiving a first instruction to discard data associated with landmarks when the difference metric corresponds to a first value, and receiving a second instruction to discard data associated with insignificant geographic points when the difference metric corresponds to a second value, wherein the first value is larger than the second value.

8. The method of claim 1, wherein determining the distance between the first geographic location and the second geographic location includes using a geographic location corresponding to a centroid of the viewport.

9. A computer-implemented method for processing geographic content in client computing devices, the method comprising:
    receiving, at a client computing device from a server, geographic data and a caching policy for the geographic data, the geographic data related to a first geographic location and the caching policy defining one or more conditions to cache or discard the geographic data at the client computing device, the one or more conditions including a distance threshold;
    displaying the geographic data within a viewport of the client computing device when the viewport depicts a digital map corresponding to the first geographic location;
    determining, at the client computing device, that the client computing device has been moved to a second geographic location;
    determining a physical distance between the first geographic location and the second geographic location;
    comparing the determined physical distance to the distance threshold; and
    caching or discarding the received geographic data based at least in part on the comparison, including caching the received geographic data when the physical distance is below the distance threshold and discarding the received geographic data when the physical distance is above the distance threshold.

10. The method of claim 9, wherein determining the physical distance includes using a geographic location corresponding to a centroid of the viewport.

11. The method of claim 9, wherein the caching policy further specifies a time threshold, the method further comprising: determining an amount of time since receiving the geographic data and comparing the determined amount of time to the time threshold, wherein caching or discarding the received geographic data is further based on comparing the determined amount to the caching policy.

12. The method of claim 11, including caching the portion of the received geographic data when the amount of time is below a threshold and discarding the portion of the received geographic data when the amount of time is above the threshold.

13. A computing device comprising:
    one or more processors; and
    a non-transitory memory readable by the one or more processors, the memory storing instructions that, when executed by the one or more processors, cause the computing device to implement a method for processing geographic content in client computing devices, the method comprising:
        receiving, from a server, geographic data and a caching policy for the geographic data, at a first time, the geographic data related to a first geographic location and the caching policy defining a condition to cache or discard the geographic data at the client computing device, wherein the condition includes a threshold related to one of distance or time;

displaying the geographic data within a viewport of the client computing device when the viewport depicts a digital map corresponding to the first geographic location;

moving the viewport to an updated position corresponding to a second geographic location;

determining, at a second time and in accordance with the condition, at least one of: (i) a distance between the first geographic location and the second geographic location, or (ii) a time difference between the first time and the second time, to generate a difference metric;

comparing the determined difference metric to the threshold in accordance with the condition; and caching or discarding the received geographic data based at least in part on the comparison, including caching the received geographic data when the difference metric is below the threshold and discarding the received geographic data when the difference metric is above the threshold.

14. The computing device of claim 13, wherein: the condition is a first condition related to distance, the caching policy further defining a second condition related to time, wherein the caching or discarding the received geographic data depends on both the first condition and the second condition.

15. The computing device of claim 14, the method further comprising receiving, at the client computing device from the server, an update to the received caching policy, subsequently to receiving the caching policy.

16. The computing device of claim 14, the method further comprising receiving, at the client computing device from the server, an instruction to delete the received caching policy.

17. The computing device of claim 14, wherein receiving the caching policy for the geographic data includes receiving different caching policies for different types of data.

18. The computing device of claim 17, wherein receiving the different caching policies includes receiving different policies for photographic image data and text data.

19. The computing device of claim 17, wherein receiving the caching policy for the geographic data includes:

receiving a first instruction to discard data associated with landmarks when the difference metric corresponds to a first value, and receiving a second instruction to discard data associated with insignificant geographic points when the difference metric corresponds to a second value, wherein the first value is larger than the second value.

20. The computing device of claim 14, wherein determining the distance between the first geographic location and the second geographic location includes using a geographic location corresponding to a centroid of the viewport.

* * * * *